United States Patent
Argott

(10) Patent No.: US 8,205,093 B2
(45) Date of Patent: Jun. 19, 2012

(54) RESTRICTING ACCESS TO INFORMATION

(75) Inventor: Lauren Argott, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 854 days.

(21) Appl. No.: 11/771,111

(22) Filed: Jun. 29, 2007

(65) Prior Publication Data

US 2009/0007259 A1    Jan. 1, 2009

(51) Int. Cl.
*G06F 21/00*    (2006.01)

(52) U.S. Cl. ........ 713/182; 370/352; 370/400; 705/26.2

(58) Field of Classification Search .................. 370/259, 370/260, 261, 262, 263, 266, 352, 400; 715/753, 715/750; 455/416; 713/182; 726/28; 348/564, 348/569, 570; 705/26.2, 26.25, 26.35
See application file for complete search history.

(56) References Cited

U.S. PATENT DOCUMENTS

| | | | |
|---|---|---|---|
| RE37,467 E * | 12/2001 | Brasch et al. .................. 340/541 |
| 7,131,132 B1 * | 10/2006 | Gehlot et al. .................... 725/10 |
| 7,205,882 B2 * | 4/2007 | Libin ........................... 340/5.28 |
| 7,421,466 B2 * | 9/2008 | Haines .......................... 709/200 |
| 7,434,166 B2 * | 10/2008 | Acharya et al. ............... 715/740 |
| 7,555,655 B2 * | 6/2009 | Smith et al. .................... 713/185 |
| 7,809,124 B2 * | 10/2010 | Archambault et al. .. 379/202.01 |
| 7,847,820 B2 * | 12/2010 | Vallone et al. ................. 348/143 |
| 2002/0198817 A1 * | 12/2002 | Dhir ................................ 705/37 |
| 2003/0088784 A1 * | 5/2003 | Ginter et al. ................... 713/189 |
| 2003/0157963 A1 * | 8/2003 | Collot ............................ 455/557 |
| 2004/0002902 A1 * | 1/2004 | Muehlhaeuser ................ 705/26 |
| 2004/0123153 A1 * | 6/2004 | Wright et al. .................. 713/201 |
| 2005/0002530 A1 * | 1/2005 | Kogan et al. .................. 380/255 |
| 2005/0018686 A1 * | 1/2005 | Igarashi et al. ............ 370/395.2 |
| 2005/0027615 A1 * | 2/2005 | Fujishige et al. ................ 705/26 |
| 2005/0033770 A1 * | 2/2005 | Oglesby et al. ............ 707/104.1 |
| 2005/0038996 A1 * | 2/2005 | Meyerson ...................... 713/165 |
| 2005/0199709 A1 * | 9/2005 | Linlor ............................ 235/380 |
| 2005/0271250 A1 * | 12/2005 | Vallone et al. ................. 382/103 |
| 2006/0080316 A1 * | 4/2006 | Gilmore et al. .................... 707/9 |
| 2006/0182249 A1 * | 8/2006 | Archambault et al. .. 379/202.01 |
| 2006/0252431 A1 * | 11/2006 | Mullen ....................... 455/456.1 |
| 2007/0024422 A1 * | 2/2007 | Doyen .......................... 340/5.81 |
| 2007/0030824 A1 * | 2/2007 | Ribaudo et al. ............... 370/328 |
| 2007/0049290 A1 * | 3/2007 | Mullen ....................... 455/456.1 |
| 2007/0067243 A1 * | 3/2007 | Malik .............................. 705/59 |
| 2007/0067852 A1 * | 3/2007 | James ............................. 726/28 |
| 2007/0124721 A1 * | 5/2007 | Cowing et al. ................ 717/100 |
| 2007/0178882 A1 * | 8/2007 | Teunissen et al. ............ 455/411 |
| 2007/0280152 A1 * | 12/2007 | Thomson et al. ............. 370/328 |

(Continued)

*Primary Examiner* — Kim Vu
*Assistant Examiner* — Sayed Beheshti Shirazi
(74) *Attorney, Agent, or Firm* — Hope Baldauff Hartman, LLC

(57) ABSTRACT

Technologies are presented herein for restricting access to information. According to various embodiments described herein, an authorization device is provided that includes functionality for detecting other proximately located authorization devices. When an authorization device detects another proximately located authorization device, authorization data stored in the detected device is retrieved. The retrieved authorization data is compared to stored authorization data and a determination is made as to whether a person associated with the detected device is authorized to receive information. The authorization device provides an indication as to whether the person is authorized to receive information. The authorization device may also provide an indication of the particular information that the person is authorized to receive. The authorization device may also be utilized to ensure that only authorized individuals participate in a meeting and that each participant is authorized to receive the information that is the subject of the meeting.

16 Claims, 11 Drawing Sheets

U.S. PATENT DOCUMENTS

| | | | |
|---|---|---|---|
| 2007/0285238 A1* | 12/2007 | Batra | 340/572.1 |
| 2008/0066157 A1* | 3/2008 | Stevens et al. | 726/4 |
| 2008/0151847 A1* | 6/2008 | Abujbara | 370/338 |
| 2009/0128329 A1* | 5/2009 | Sato et al. | 340/568.1 |
| 2009/0148827 A1* | 6/2009 | Argott | 434/433 |
| 2009/0184842 A1* | 7/2009 | Baldus et al. | 340/870.07 |
| 2010/0117794 A1* | 5/2010 | Adams et al. | 340/5.83 |

* cited by examiner

RESTRICTING ACCESS TO INFORMATION

TECHNICAL FIELD

This application relates generally to restricting access to information. More particularly, this application relates to technologies for ensuring that only individuals with appropriate authorization are permitted to receive certain information.

BACKGROUND

In many organizations confidential information is provided only to those employees and outside vendors that need access to the information. For instance, confidential information relating to a new product in development may be restricted to only those employees on a team that is developing the new product. Employees that are not on the team are prohibited from accessing the confidential information relating to the new product. As another example, confidential information relating to a particular client project may be restricted to only those employees working on the project.

In order to limit the dissemination of confidential information to only those individuals authorized to receive the information, many organizations require employees and vendors to sign one or more confidentiality agreements. Confidentiality agreements are legal agreements by which the parties to the agreement agree not to disclose information covered by the agreement, except to other individuals that have signed similar agreements. In the employment context, this generally means that an employee agrees not to disclose information covered by the confidentiality agreement except to other employees that have also signed a confidentiality agreement covering the disclosed information. Confidentiality agreements are also referred to as non-disclosure agreements ("NDAs"), confidential disclosure agreements ("CDAs"), and secrecy agreements.

In many organizations, employees are required to sign a broad confidentiality agreement at the time they are hired. Subsequently, as an employee begins to work on various projects, they may also be required to sign additional confidentiality agreements covering the disclosure of confidential information related to the particular projects. Each employee, therefore, may be covered by multiple confidentiality agreements at any given time. As a result, it can be difficult for an employee to know whether they may discuss a particular matter with another employee in the company. This can result in considerable discussion among employees regarding whether each employee has signed the appropriate confidentiality agreement prior to discussing a matter. This process can be very time consuming, especially in large meetings where many employees are present. Moreover, when the mere existence of a matter is itself confidential, an employee may be prohibited from even asking another employee if they are covered by the appropriate confidentiality agreement.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are provided herein for restricting access to information. In particular, according to one embodiment presented herein, an authorization device is provided that includes functionality for determining whether proximately located individuals are authorized to receive confidential information, such as information covered under a confidentiality agreement. In one embodiment, each person within an organization would be provided an authorization device that is programmed with authorization data identifying the information that the associated person is authorized to receive. For instance, the authorization device may be programmed with data identifying each of the confidentiality agreements that the person has signed. Each person may be required to carry his or her authorization device at all times.

According to implementations, the authorization device includes the ability to detect other proximately located authorization devices. For instance, each authorization device may transmit a wireless signal that is detectable by other authorization devices within an area approximately equivalent to the area in which a human voice may be heard. The authorization device may periodically attempt to detect proximately located authorization devices or may do so in response to a user request. In this manner, each authorization device can detect other authorization devices carried by individuals that are located within earshot. By detecting such individuals and providing an indication regarding the information the detected individuals are authorized to receive, an inadvertent disclosure of confidential information to an unauthorized person can be avoided.

When an authorization device detects another proximately located authorization device, the authorization data stored in the detected device is retrieved. The retrieved authorization data is compared to stored authorization data and a determination is made as to whether the person associated with the detected device is authorized to receive information. For instance, in one implementation, the authorization data comprises data identifying all of the confidentiality agreements that the person associated with the device has signed. In this implementation, the data identifying the confidentiality agreements is examined to determine whether the person associated with the detected authorization device is authorized to receive information under a particular confidentiality agreement.

The authorization device provided herein is also operative in one embodiment to provide an indication when a person associated with a proximately located authorization device is not authorized to receive information. For instance, a visible or audible indication may be provided indicating that a person is proximately located that is not authorized to receive information under a particular confidentiality agreement. The authorization device may also provide an indication that a proximately located person is authorized to receive information. According to embodiments, the authorization device may provide an indication of the particular information that the proximately located person is authorized to receive. For instance, the authorization device may identify each of the confidentiality agreements under which the person associated with the proximately located authorization device is authorized to receive information.

According to further embodiments of the disclosure provided herein, the authorization device described herein can be utilized to ensure that only individuals authorized to receive certain information are present at a meeting. In this embodiment, data is received that identify all of the expected participants at a meeting. This information may be retrieved from an electronic calendar, from a user, or from another location. A reader device is then utilized to detect any proximately located authorization devices. For instance, the reader device may detect all authorization devices located within a meeting room. The reader device also retrieves data from each detected authorization device identifying the associated person. The retrieved information identifies the actual meeting participants. If the actual meeting participants do not match the expected meeting participants, an indication may be provided indicating that too many or too few persons are present at the meeting.

The data retrieved by the reader may also be utilized to ensure that each of the actual meeting participants is authorized to receive information at the meeting. In this embodiment, the reader device retrieves the authorization data from each of the detected authorization devices. The received authorization data is utilized to determine whether each of the actual meeting participants is authorized to receive information at the meeting. An indication is provided if one or more of the actual meeting participants are not authorized to receive the information. In another embodiment, the authorization data for the expected meeting participants may be retrieved and examined prior to a meeting to determine whether each of the expected meeting participants has the appropriate authorization for the meeting. A notification may be transmitted to the participant, the participant's supervisor, or other appropriate individuals if an expected meeting participant does not have the proper authorization. In this manner, the participant can sign the proper confidentiality agreement and have their authorization device programmed accordingly prior to the meeting.

Other apparatus, systems, methods, and/or computer program products according to embodiments will be or become apparent to one with skill in the art upon review of the following drawings and Detailed Description. It is intended that all such additional apparatus, systems, methods, and/or computer program products be included within this description, be within the scope of the present invention, and be protected by the accompanying claims.

DETAILED DESCRIPTION

The following detailed description is directed to technologies for restricting access to information. While the subject matter described herein is presented in the general context of hardware devices, program modules that execute in conjunction with the execution of an operating system, and application programs executing on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein may be practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

Figure 1:
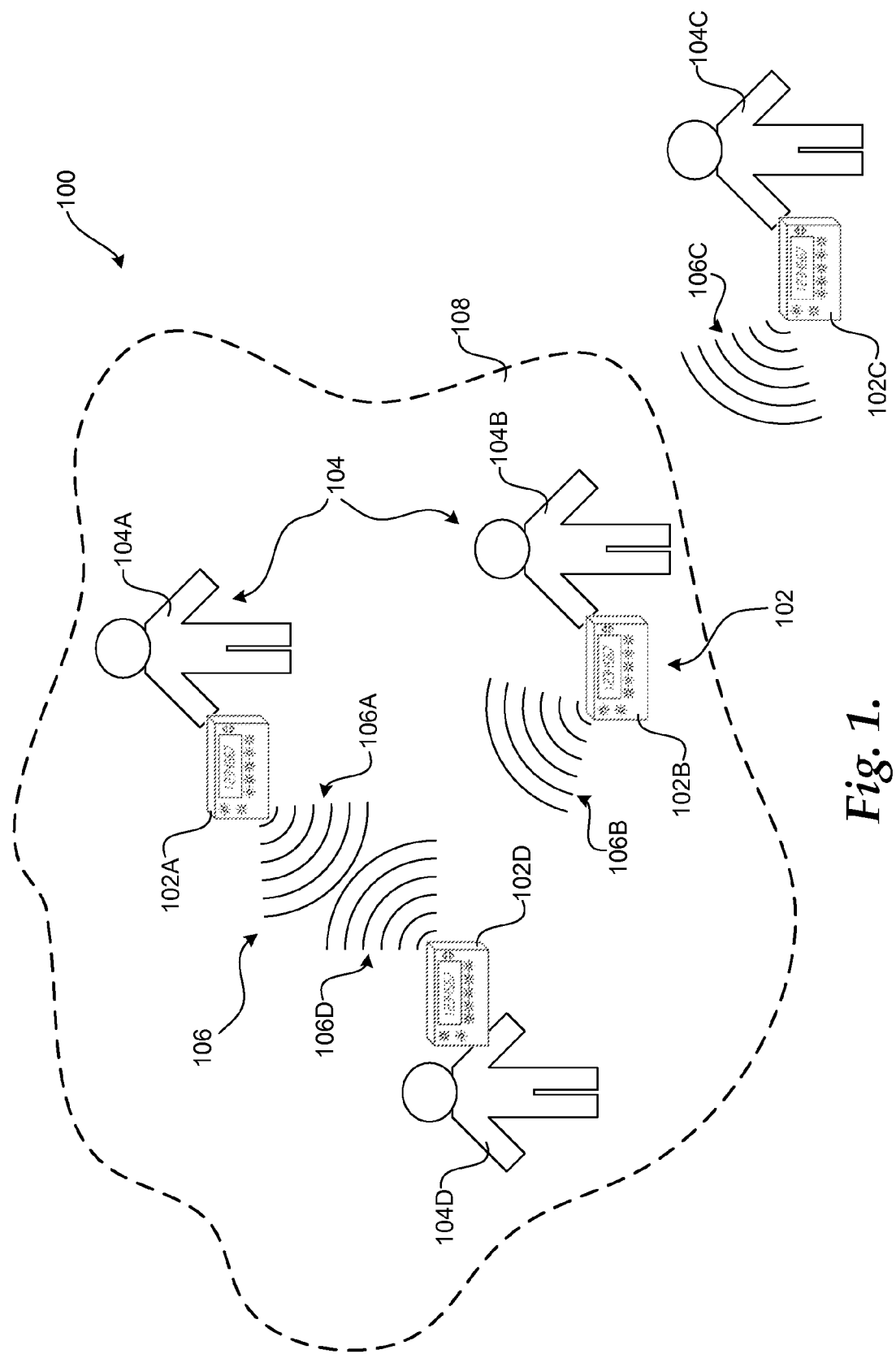
FIG. 1 is a system diagram showing aspects of an illustrative system for restricting access to information provided in one embodiment described herein.

As discussed briefly above, it can be difficult for employees of an organization to know whether they can discuss certain information with other employees or vendors of the organization. In order to address this difficulty and others, the system 100 illustrated in FIG. 1 is presented. In one embodiment, the system 100 includes the authorization devices 102A, 102B, 102C, and 102D (collectively referred to herein as 102). Each of the authorization devices 102A, 102B, 102C, and 102D is associated with a person. For instance, as shown in FIG. 1, the authorization device 102D is associated with the person 104D, the authorization device 102A is associated with the person 104A, the authorization device 102B is associated with the person 104B, and the authorization device 102C is associated with the person 104C. According to embodiments, an organization may require that each person 104 within the organization is assigned an authorization device 102 and that each person 104 carry their assigned authorization device 102 at all times. It should be appreciated, therefore, that more or fewer authorization devices 102 might be utilized than illustrated in FIG. 1.

As will be discussed in greater detail below, each of the authorization devices 102A, 102B, 102C, and 102D is operative to detect other proximately located authorization devices 102. For instance, each of the authorization devices 102A, 102B, 102C, and 102D is operative to detect another authorization device 102 within a proximate area 108. In one implementation, the area 108 is approximately the area in which a human voice may be heard. For instance, as shown in FIG. 1, the authorization devices 104A, 104B, and 104D can detect one another within the area 108. The area 108 is approximately equal to the area within which a human voice, such as the voice of one of the persons 104A, 104B, and 104D may be heard. In this manner, the presence of the persons 104A, 104B, and 104D can be detected and an inadvertent disclosure of confidential information to these persons can be avoided. Because the authorization device 102C is outside the area 108, the authorization devices 102A, 102B, 102C, and 102D would not detect the presence of this device. Because the authorization device 102C is out of earshot, however, the person 104C would not be able to hear a confidential conversation between the persons 104A, 104B, and 104D.

In one implementation, each of the authorization devices 102A, 102B, 102C, and 102D utilizes a low-power short-range wireless radio signal to detect other proximately located authorization devices 102. For instance, as shown in FIG. 1, each of the authorization devices 102A, 102B, 102C, and 102D may transmit a wireless signal 106A, 106B, 106C, and 106D (collectively referred to herein as 106), respectively, that can be received by other authorization devices 102 that are proximately located. In embodiments, the BLUETOOTH wireless radio standard may be utilized for the transmission of the wireless signals 106A, 106B, 106C, and 106D. In other implementations, the WI-FI wireless radio standard may be utilized. It should be appreciated, however, that virtually any short-range wireless radio standard might be utilized. It should also be appreciated that other technologies may be utilized to enable each of the authorization devices 102A, 102B, 102C, and 102D to detect other proximately located authorization devices 102. For instance, each of the authorization devices 102A, 102B, 102C, and 102D may be equipped with a global positioning system ("GPS") receiver for determining its geographic location. Other similar technologies may also be utilized for detecting proximately located authorization devices.

As will also be described in greater detail below, each of the authorization devices 102A, 102B, 102C, and 102D may be programmed with authorization data for the associated person 104A, 104B, 104C, and 104D, respectively. The authorization data identifies the topics on which the associated person 104 is authorized to receive information. For instance, in one implementation, the authorization data comprises a list of the confidentiality agreements that the person 104 associated with the authorization device 102 has signed. When two authorization devices 102 detect one another, they exchange the stored authorization data with one another. Each device then compares its stored authorization data with the authorization data received from the detected device 102 to determine if the person 104 associated with the detected authorization device 102 is authorized to receive information. Each authorization device 102 then provides an indication, such as a visual or audible indication, as to whether the person associated with the detected authorization device 102 is authorized to receive the information. Additional details regarding the operation of the authorization devices 102A, 102B, 102C, and 102D in this regard is provided below.

Figure 2:
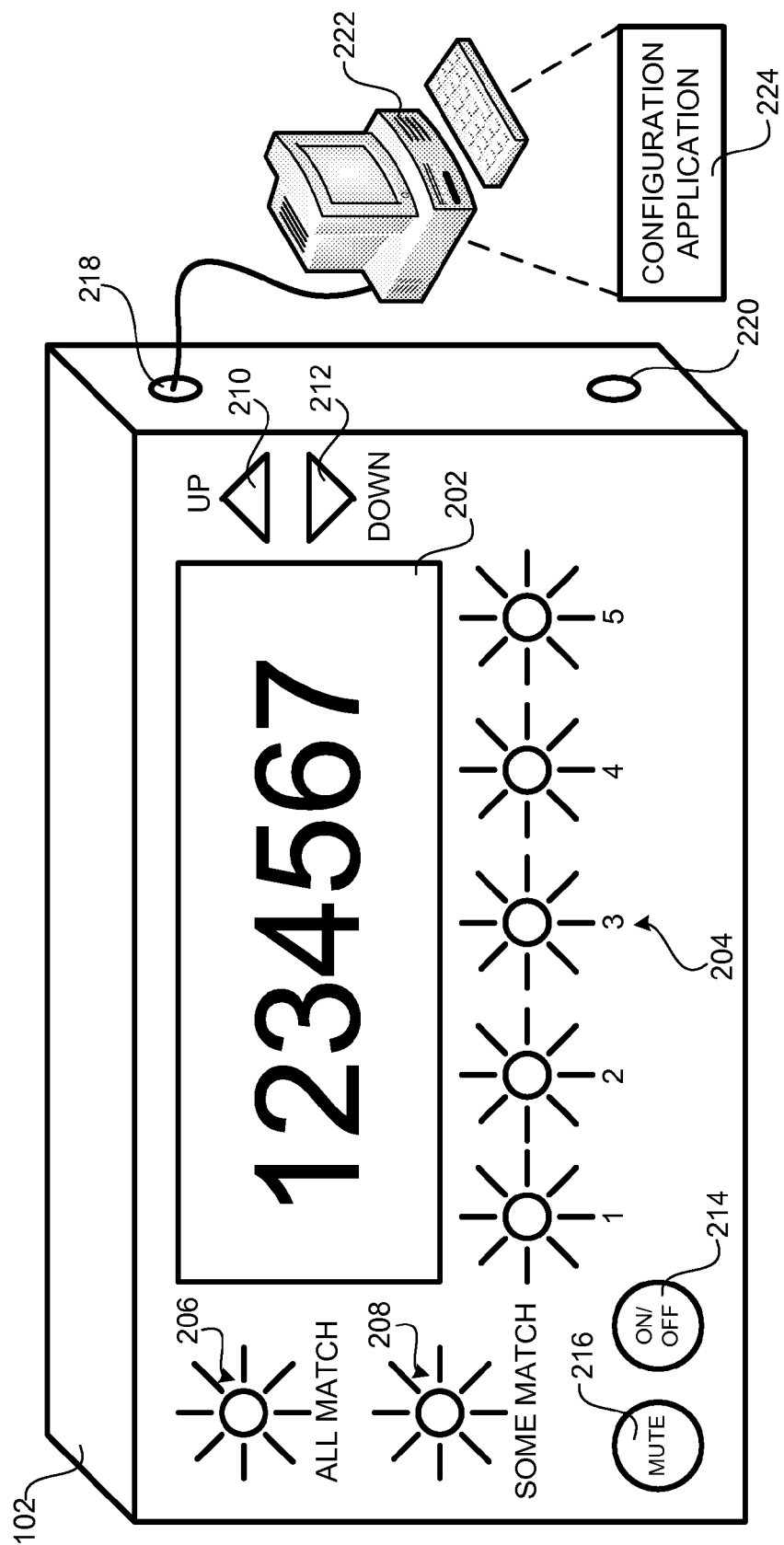
FIG. 2 is a pictorial diagram showing aspects of an authorization device provided in one embodiment presented herein.

Referring now to FIG. 2, an illustrative authorization device 102 provided in one implementation will be described. As shown in FIG. 2, the authorization device 102 comprises a battery-powered hand-held computing device in one implementation. As discussed briefly above, the authorization device 102 may periodically attempt to detect other proximately located authorization devices 102. The authorization device 102 may also include a button that allows a user to manually cause a search to be made for proximately located authorization devices 102. In one embodiment, a power on/off button 214 may be utilized to both power the device 102 on and off and to cause a search to be made for proximately located devices 102 when pressed momentarily.

According to aspects, the authorization device 102 includes a display screen 202 for providing information regarding the operation of the authorization device 102, such as identifying detected authorization devices 102, providing a visual indication of the authorization data received from detected authorization devices 102, and other data. Selection buttons 210 and 212 may be utilized to cause the authorization device 102 to scroll through information presented on the display screen 202.

According to aspects, the authorization device 102 may also include one or more lighted buttons 204. The lighted buttons 204 may be assigned to a particular confidentiality agreement and pressed to view the assigned agreement on the display screen 202. The lighted buttons 204 may also be lit when a detected authorization device 102 includes the corresponding confidentiality agreement in its authorization data. The lighted buttons 204 may be flashed or lit in another color when a detected authorization device 102 does not include the corresponding confidentiality agreement in its authorization data. It should be appreciated that more or fewer lighted buttons 204 may be utilized and that other types of buttons, lights, or displays may be utilized to provide this functionality.

According to implementations, the authorization device 102 also includes an indicator light 206 and an indicator light 208. The indicator light 206 is utilized to provide a visual indication when all of the authorization data received from a detected authorization device matches the authorization data stored in the authorization device 102. For instance, the indicator light 206 will be illuminated in one embodiment if the stored authorization data identifies all of the same confidentiality agreements as stored in the detected authorization device 102. The indicator light 208 may be illuminated if some, but not all, of the stored authorization data matches the authorization data received from a detected device authorization device 102. It should be appreciated that although visual indicators have been described above with respect to the lighted buttons 204 and the indicator lights 206 and 208, other types of indications may be provided. For instance, an audible indication may be provided through the use of a speaker or a tactile indication may be provided through the use of a vibration module. Any suitable indication may be provided to indicate to a user of the authorization device 102 that a person associated with a detected device is or is not authorized to discuss certain information. All of these types of indications may be temporarily or permanently disabled through the selection of a mute button 216.

According to other implementations, the authorization device 102 includes a computer interface port 218. The computer interface port 218 allows a computer 222 to be interfaced to the authorization device 102. The computer interface port 218 may comprise a universal serial bus ("USB") communications port, a FIREWIRE communications port, or other type of communications port suitable for connecting a computing device to the computer 222. Alternatively, the computer interface port 218 may comprise a wireless communications port for communicating with the device, such as a BLUETOOTH or WI-FI communications port. Through such a connection, a configuration application 224 executing on the computer 222 may be utilized to configure the operation of the authorization device 102. For instance, the configuration application 224 may be utilized to assign particular confidentiality agreements to the lighted buttons 204, to configure the manner in which indications are provided, to assign particular sounds to confidentiality agreements or other types of indications, and to configure other aspects of the operation of the authorization device 102. Power received on the computer interface port 218 may also be utilized to charge a rechargeable battery contained within the authorization device 102. The authorization device 102 may also include a power port 220 for connecting an external direct current ("DC") adapter for charging the rechargeable battery.

Figure 3:
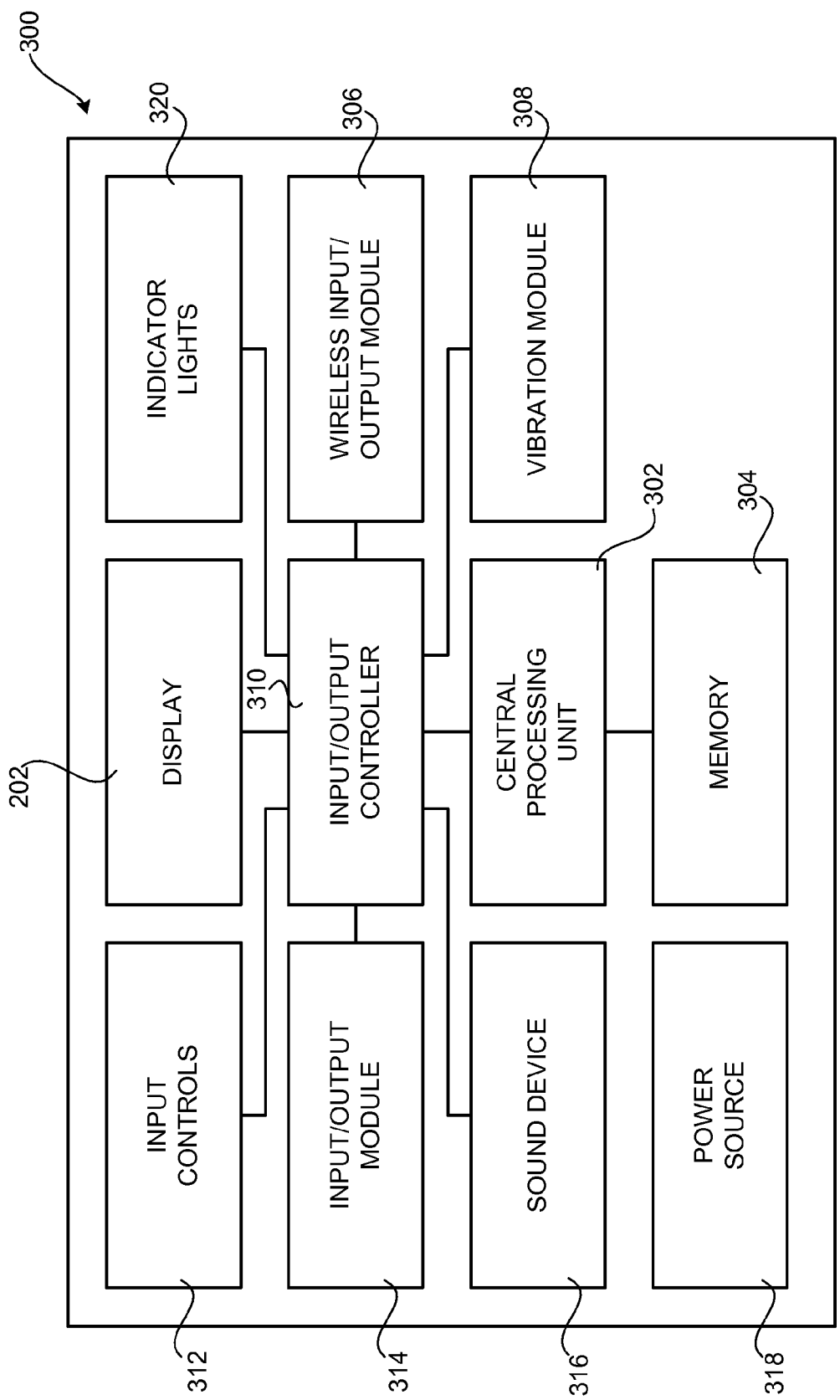
FIG. 3 is a schematic diagram showing an illustrative hardware architecture for an authorization device in one embodiment described herein.

Turning now to FIG. 3, an illustrative hardware architecture 300 for the authorization device 102 will be presented. As shown in FIG. 3, the hardware architecture 300 includes a central processing unit ("CPU") 302 that controls the operation of the authorization device 102 by executing software stored in a non-volatile memory 304. The contents of the memory 304 will be discussed below with respect to FIG. 4. The CPU 302 also interfaces with an input/output ("I/O") controller 310 to control the operation of indicator lights 320, the display 202, input controls 312, an I/O module 314, a wireless I/O module 306, a sound device 316, and a vibration module 308. A power source 318, such as a rechargeable battery, powers the operation of the CPU 302, the I/O controller 310, and the other components described above. The input controls 312 may include buttons contained within the lighted buttons 204, the selection buttons 210 and 212, the power on/off button 214, and the mute button 216.

According to embodiments, the wireless I/O module 306 comprises a low-power wireless transceiver for generating the low-power short-range wireless radio signal described above with reference to FIG. 1. Therefore, the wireless I/O module 306 may be compatible with the BLUETOOTH or WI-FI wireless radio standards. Other types of low-power short-range wireless radio signals may be similarly utilized. The indicator lights 320 may comprise the indicator lights 206 and 208 and the lights contained in the lighted buttons 204, described above. Other lights and indicators may also be present on the authorization device 102. According to embodiments, the input controls 302 include the mute button 216, the on/off button 214, the lighted buttons 204, and the selection buttons 210 and 212. It should be appreciated that although the authorization device 102 has been described as having a separate display 202 and separate input controls, these input and output devices may be merged through the use of a touch-sensitive display screen. Other types of input devices and output devices may also be utilized.

In addition to providing a visual indication through the use of the indicator lights 320, the authorization device 102 may provide an audible indication through the use of the sound device 316. The sound device 316 may comprise a small amplifier and speaker or other type of device capable of generating an audible signal. A tactile indication may also be provided through the use of the vibration module 308. The vibration module 308 comprises any type of device capable of causing the authorization device 102 to vibrate when activated. It should be appreciated that the hardware architecture shown in FIG. 3 and described above is merely illustrative and that fewer or more components may be included than those shown in FIG. 3.

Figure 4:
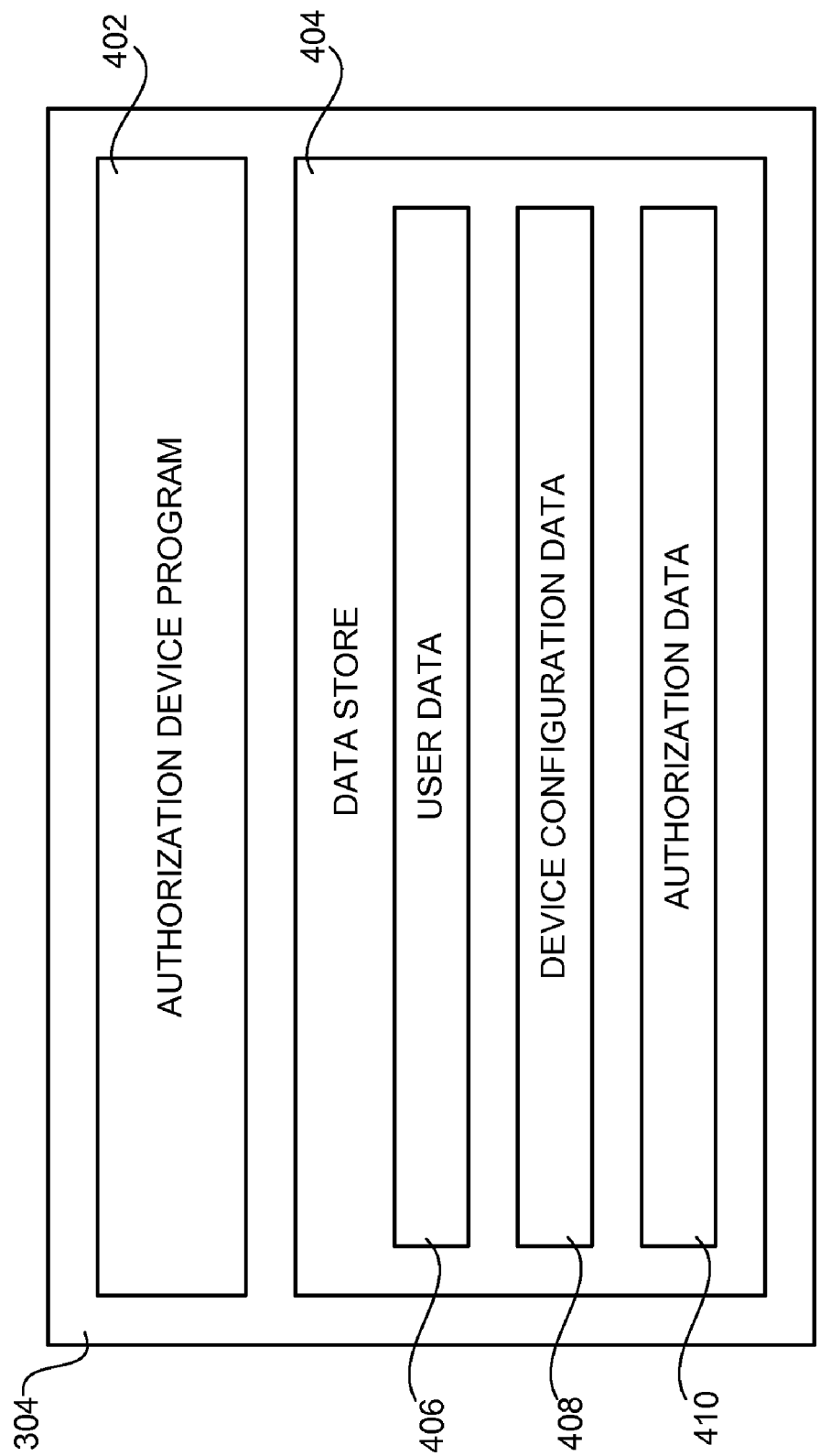
FIG. 4 is a memory diagram showing the contents of a memory device utilized in an authorization device in one implementation presented herein.

Referring now to FIG. 4, an illustrative software architecture utilized by the authorization device 102 will be presented. In particular, FIG. 4 illustrates the contents of the memory device 304. As shown in FIG. 4, the memory device 304 is utilized to store an authorization device program 402, which is executed by the CPU 302 to control the operation of the authorization device 102. Details regarding the processing steps performed by the authorization device program 402 are described below.

The memory device 304 is also utilized to hold a data store 404. The data store 404 includes user data 406, device configuration data 408, and authorization data 410. The user data 406 includes data identifying the user associated with a particular authorization device 102. For instance, according to implementations, the user data 406 may include the name, identifier, and other information for the person with which the authorization device 102 is associated. In the case of a vendor, the user data 410 may include detailed information regarding the employer of the person with which the authorization device 102 is associated. The device configuration data 408 includes data generated by the configuration application 224 that defines how the authorization device 102 should operate. For instance, data defining user preferences for how the authorization device 102 should operate may be stored in the device configuration data 408 by the configuration application 224.

The authorization data 410 identifies the topics on which the person 104 associated with the authorization device 102 is authorized to receive information. For instance, in one implementation, the authorization data 410 comprises a list of the confidentiality agreements that the person 104 associated with the authorization device 102 has signed. In one embodiment, an expiration date may also be stored in the authorization data 410 corresponding to each confidentiality agreement. Once the expiration data has passed, the corresponding authorization data will no longer be considered valid. Additional details regarding the operation of the authorization device program 402 and the use of the authorization data 410 will be provided below with respect to FIG. 5.

Figure 5:
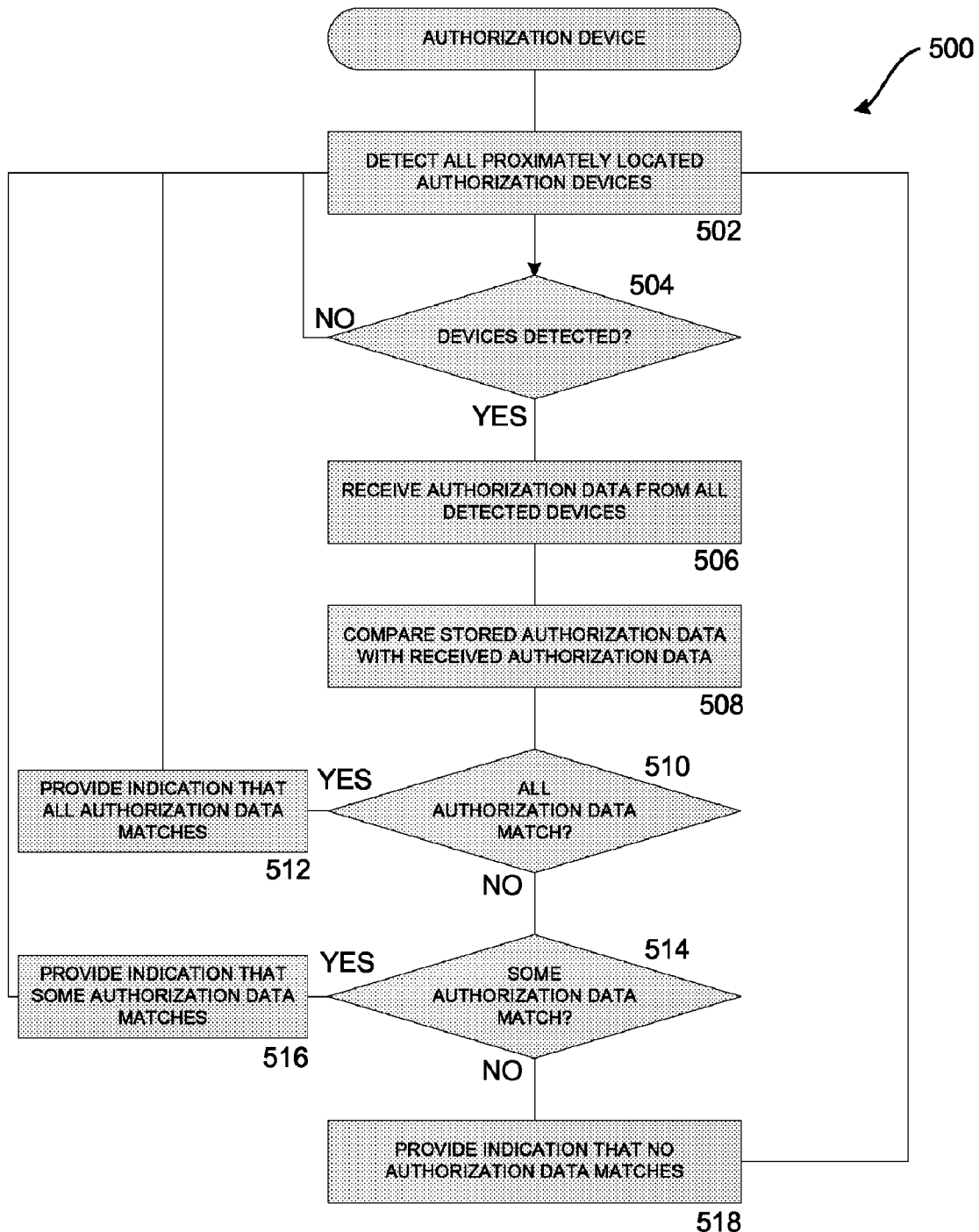
FIG. 5 is a flow diagram illustrating the operation of an authorization device presented herein in one embodiment.

Turning now to FIG. 5, an exemplary routine 500 will be described that illustrates the operation of the authorization device 102 according to one embodiment presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination. It should also be appreciated that more or fewer operations than shown may be performed and that the operations may be performed in a different order.

The routine 500 begins at operation 502, where the authorization device 102 detects other authorization devices 102 that are proximately located. As discussed above, detection may be performed periodically by the authorization device 102 or may be performed in response to a user request. As also discussed briefly above, the authorization device 102 transmits a wireless radio signal utilizing the wireless I/O module 306 in order to detect other proximately located authorization devices 102.

From operation 502, the routine 500 continues to operation 504, where the authorization device 102 determines whether any other authorization devices 102 were detected in a proximate area. If not, the routine 500 returns to operation 502, where another attempt may be made to detect proximately located authorization devices 102. If any authorization devices 102 are detected, the routine 500 continues to operation 506 where the authorization device 102 that performed the detection operation receives the authorization data 410 from any detected authorization devices 102. The authorization data 410 is received wirelessly via the wireless radio signal generated by the wireless I/O module 306. Once the authorization data 410 has been received, the routine 500 continues to operation 508.

At operation 508, the authorization device 102 compares its stored authorization data 410 to the authorization data 410 received from a detected authorization device 102. For instance, in an embodiment wherein the authorization data 410 comprises a list of confidentiality agreements signed by the associated person, the authorization device 102 may compare the confidentiality agreements to determine whether all, some, or none of the agreements match. For each agreement that is identified in both authorization devices 102, an indication may be provided that disclosure of information under the agreement is permissible. For each agreement for which no match is found, an indication may be provided that no disclosure should be made. This process is described below.

From operation 508, the routine 500 continues to operation 510, where the authorization device 102 determines whether all of its stored authorization data 410 matches the authorization data 410 received from a detected device 102. If so, the routine 500 branches from operation 510 to operation 512 where an indication is provided that all of the authorization data 410 matches. For instance, the indicator light 206 may be illuminated to indicate that all of the authorization data 410 matches. As discussed above, another type of indication may also be provided. From operation 512, the routine 500 returns to operation 502, discussed above.

If, at operation 510, the authorization device 102 determines that only some of its stored authorization data 410 matches the authorization data 410 received from a detected device 102 (e.g. the person associated with a detected authorization device 102 has signed only some of the confidentiality agreements identified in the stored authorization data 410), the routine 500 branches to operation 516. At operation 516, the authorization device 102 provides an indication that only some of the authorization data 410 matches. For instance, in one implementation, the indicator light 208 may be illuminated. In another embodiment, the particular lighted buttons 204 may be illuminated that correspond to the authorization data 410 that matches. An identifier for the matching authorization data 410 may also be presented in the display 202. The selection buttons 210 and 212 may be utilized to scroll the display through the appropriate authorization data 410. Other types of indications may also be provided. From operation 516, the routine 500 returns to operation 502, discussed above.

If, at operation 518, the authorization device 102 determines that none of its stored authorization data 410 matches the authorization data 410 received from a detected device 102 (e.g. the person associated with a detected authorization device 102 has not signed any of the confidentiality agreements identified in the stored authorization data 410), the routine 500 continues from operation 514 to operation 518. At operation 518, the authorization device 102 provides an indication that none of the authorization data 410 matches. This may include, for example, providing a visual, audible, or tactile indication to the user that the person associated with the detected authorization device 102 is not authorized to receive any information. From operation 518, the routine 500 returns to operation 502, discussed above.

Figure 6:
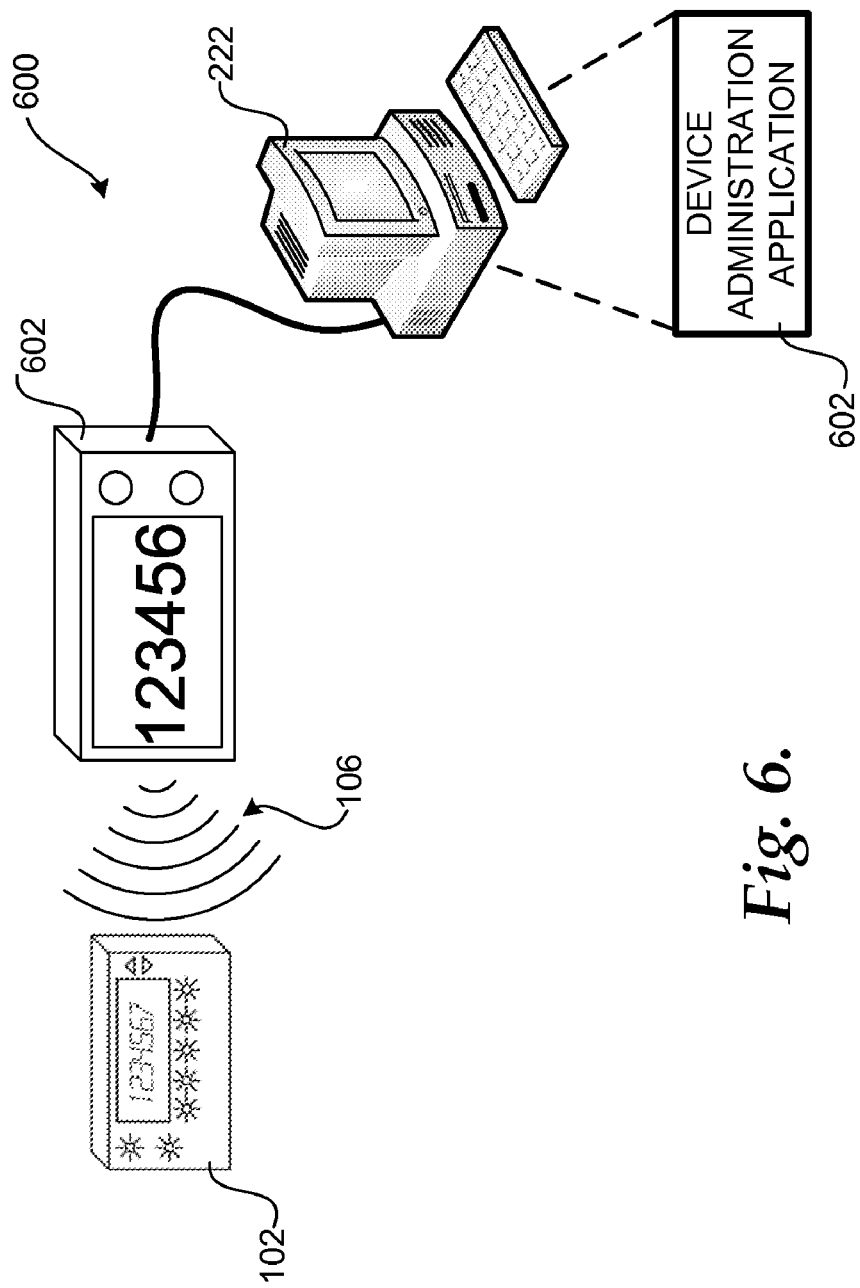
FIG. 6 is a system diagram showing aspects of an administration device utilized in conjunction with an authorization device provided herein in one embodiment.

Referring now to FIG. 6, aspects of device administration application 602 provided in one implementation presented herein will be described. As shown in FIG. 6 the administration application 602 is provided in one implementation for use by an administrator to reset an authorization device 102 and to program the authorization data 410 into an authorization device 102. In one implementation the administration application 602 is utilized in conjunction with a computer 222 executing the device administration application 602. The device administration application 602 provides functionality for receiving the authorization data 410 for a user and for programming the received authorization data 410 into the authorization device 102. For instance, the device administration application 602 may receive identifiers for one or more confidentiality agreements signed by a person associated with the authorization device 102. In response thereto, the device administration application 602 may program this data into the authorization device 102 for use in the manner described above. The device administration application 602 may include appropriate security mechanisms to ensure that only an authorized administrator can program the authorization device 102.

Figure 7:
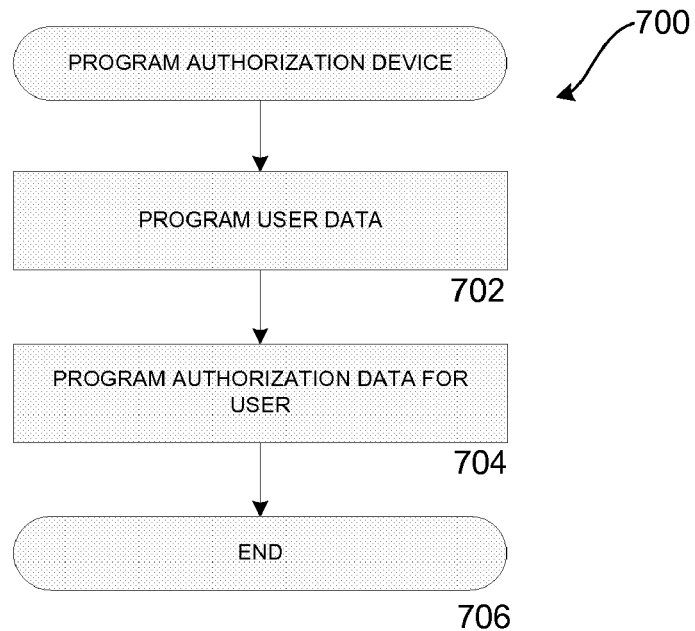
FIGS. 7 and 8 are flow diagrams illustrating the operation of an administration device for programming and resetting an authorization device, respectively, according to various embodiments presented herein.
Figure 8:
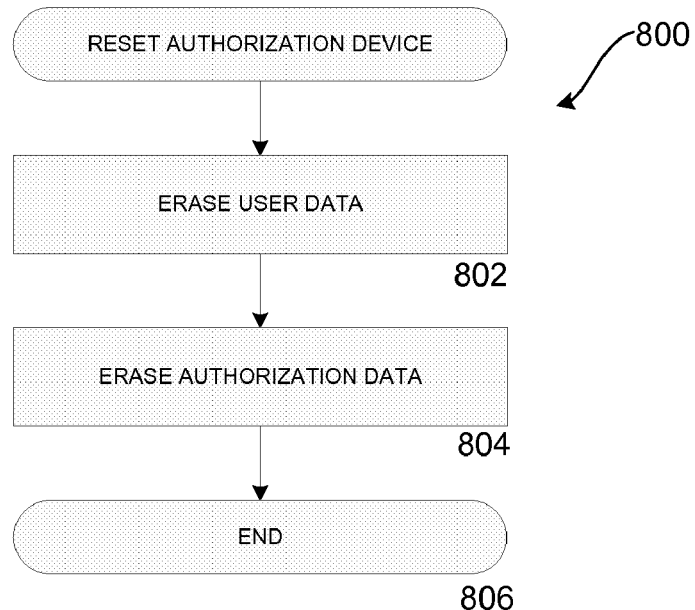

According to implementations, the device administration application 602 may communicate with the authorization device 102 by way of the wireless signal 106. Alternatively, the administration device 602 may be connected to the authorization device 102 with a wired connection (not shown in FIG. 6). According to yet another implementation, the authorization device 102 may be connected directly to the computer 222 through a suitable wired or wireless connection for programming without the use of the administration device 602. FIGS. 7 and 8 illustrate processes performed by the device administration application 602 for programming and resetting the authorization device 102, respectively.

Turning now to FIG. 7, an exemplary routine 700 will be described illustrating the programming of the authorization device 102. Each authorization device 102 initially contains no user data 406 or authorization data 410. In order to program the user data 406 and the authorization data 410, an administrator establishes a connection to the authorization device 102 to be programmed in the manner described above with respect to FIG. 6.

Once a connection to the authorization device 102 has been established, the administrator provides the user data 406 to be programmed into the authorization device 102. For instance, the administrator may provide the name and employee number of an employee that will be associated with the authorization device 102 being programmed. This user data 406 is then programmed into the authorization device 102 at operation 702 by the device administration application 602.

Once the user data 406 has been programmed into the authorization device 102, the routine 700 then continues to operation 704. At operation 704, the administrator provides the authorization data 410 to be programmed in the authorization device 102 to the device administration application 602. For instance, the administrator may provide identifiers for all of the confidentiality agreements that the employee has signed. The device administration application 602 programs this information into the authorization device 102 at operation 704. Once the user data 406 and the authorization data 410 have been programmed into the authorization device 102, the routine 700 continues to operation 706, where it ends.

Referring now to FIG. 8, an illustrative routine 800 will be described illustrating the resetting of the authorization device 102. According to embodiments, the memory device 304 of the authorization device 102 may be reprogrammed with user data 406 and authorization data 410. In this way, each authorization device 102 can be reassigned to a new person and reprogrammed. This may be useful, for instance, to reuse the authorization device 102 after an employee leaves employment with a company. In order to reset the user data 406 and the authorization data 410, an administrator establishes a connection to the authorization device 102 to be programmed in the manner described above with respect to FIG. 6.

Once a connection to the authorization device 102 has been established, the device administration application 602 erases the user data 406. This occurs at operation 802. Once the user data 406 has been erased, the routine 800 continues to operation 804, where the authorization data 410 is also erased. Once the authorization data 410 has been erased, the authorization device 102 is in condition for programming for a new user in the manner described above with reference to FIG. 7. From operation 804, the routine 800 continues to operation 806, where it ends.

Figure 9:
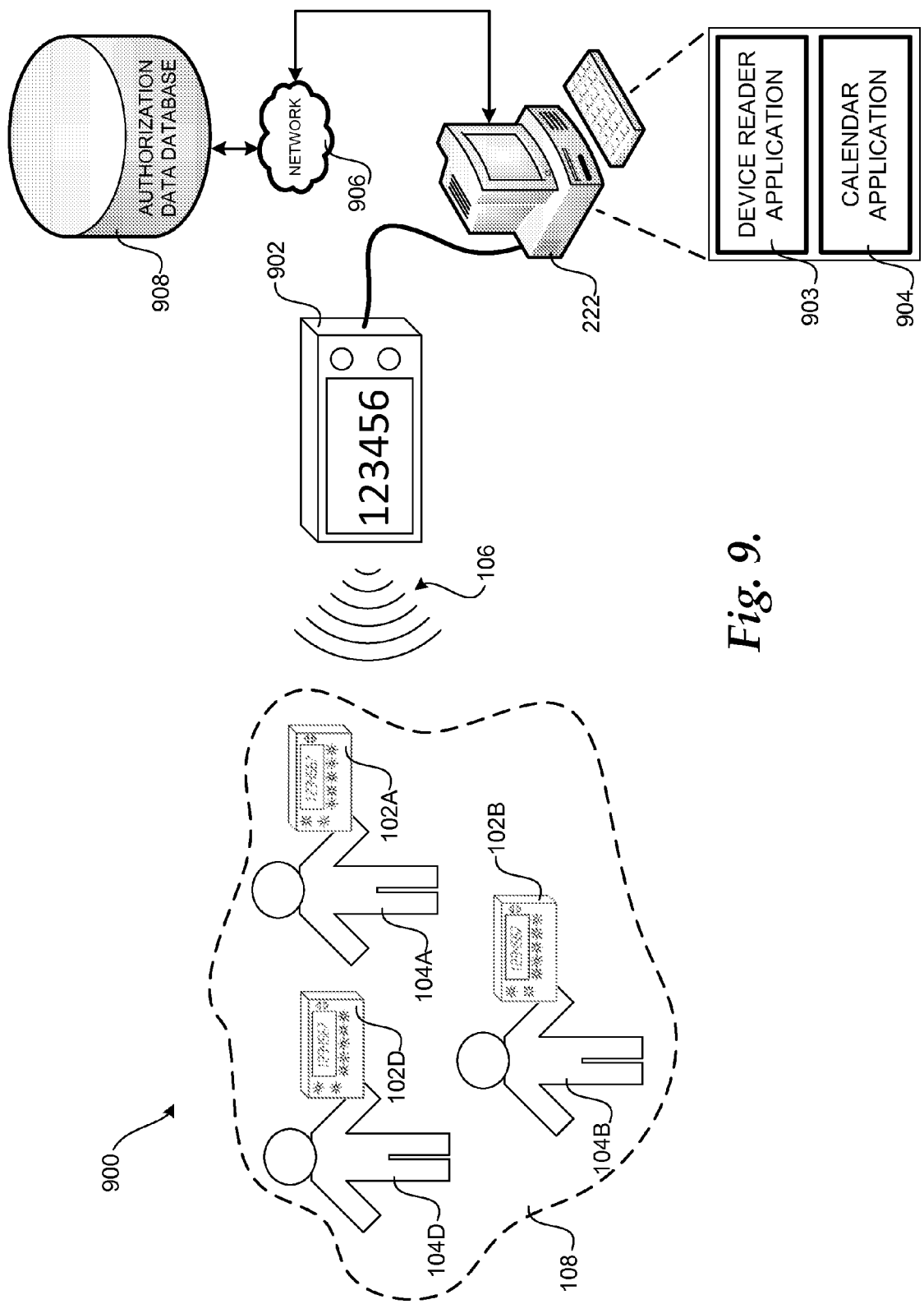
FIG. 9 is a system diagram illustrating aspects of a reader device utilized in conjunction with one or more authorization devices in one embodiment presented herein.

Turning now to FIG. 9, a system 900 will be described that includes a reader device 902 utilized in conjunction with one or more authorization devices 102A, 102B, and 102D in one embodiment presented herein. As shown in FIG. 9, the reader device 902 interfaces with the computer 222 and operates in conjunction with a device reader application 903 executing on the computer 222. The reader device 902 provides functionality for detecting all of the authorization devices 102A, 102B, and 102D within the proximate area 108.

In order to detect the authorization devices 102A, 102B, and 102D, the reader device 902 may transmit the wireless signal 106 compatible with the wireless signals utilized by the authorization devices 102A, 102B, and 102D. As shown in FIG. 9, the reader device 902 may include a display screen for presenting information regarding the authorization devices 102A, 102B, and 102D with which it is communicating. The reader device 902 may also include some or all of the other hardware and software components described above with respect to FIGS. 2 and 3. In other embodiments, the computer 222 is operative to detect the authorization devices 102A, 102B, and 102D without the use of the reader device 902 utilizing an integrated or external wireless adapter, such as a BLUETOOTH adapter.

As will be described in greater detail below with respect to FIG. 10, the device reader application 903 operates in conjunction with the reader device 902. In particular, in one embodiment, the device reader application 903 may receive the identities of a number of expected participants at a meeting, such as from a calendar item for the meeting stored by a calendar application 904 or manually from a user. The device reader application 903 may also utilize the reader device 902 to detect the number of actual participants at the meeting by detecting authorization devices 102A, 102B, and 102D that are present within the proximate area 108. If the number and identities of the actual attendees at the meeting do not match the number and identities of the expected attendees at the meeting, the device reader application 903 may provide an indication to an administrator. In this manner, an administrator can guarantee that only the expected meeting attendees are present at a meeting. The device reader application 903 can also retrieve the authorization data 410 from each of the detected authorization devices 102. The retrieved data can be utilized to determine whether all of the actual participants at the meeting are authorized to receive the information that is the subject of the meeting. Additional details regarding these processes are provided below with respect to FIG. 10.

As also shown in FIG. 9, the computer 222 may establish a connection to an authorization data database 908 via a network 906. The authorization data database 908 is utilized to store the user data 406 and the authorization data 410 for each of the persons 104A, 104B, and 104D. Once the actual attendees at a meeting have been identified in the manner described above, the device reader application 903 can retrieve the authorization data 410 for each of the actual meeting attendees. The device reader application 903 then compares the authorization data 410 for each of the attendees to an identifier for the information to be discussed at a meeting, such as a number corresponding to a confidentiality agreement covering the subject matter of the meeting. This information may be obtained manually from a user or from the calendar application 904. Based on this comparison, the device reader application 903 can determine whether all of the attendees have authorization to receive the information that is the subject of the meeting. If not, an indication may be provided to a user of the device reader application 903. This process may also be performed prior to a meeting time to ensure that all expected meeting attendees have the proper authorization prior to the scheduled meeting time. Details regarding this embodiment are provided below with respect to FIG. 11.

Figure 10:
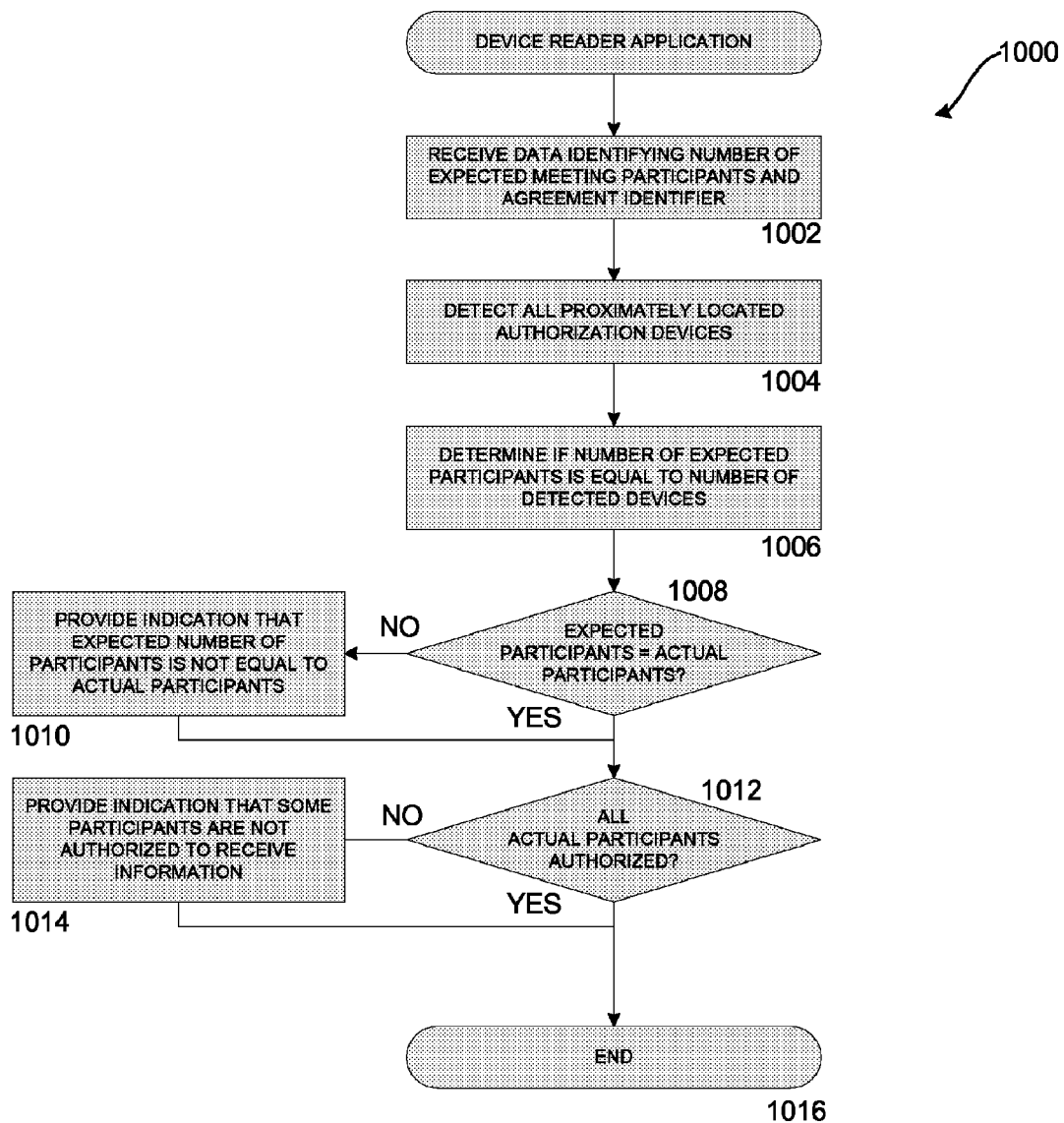
FIG. 10 is a flow diagram illustrating the operation of the reader device for determining whether the actual participants at a meeting are authorized to receive information according to one implementation presented herein.

Referring now to FIG. 10, a routine 1000 will be described that illustrates the operation of the reader device 902 and the device reader application 903 for determining whether the actual participants at a meeting are authorized to receive information in one implementation presented herein. The routine 1000 begins at operation 1002, where the device reader application 903 receives data identifying the number and identities of the expected participants at a meeting. The device reader application 903 also receives an identifier for the information to be discussed at a meeting, such as the number corresponding to a confidentiality agreement covering the subject matter of the meeting. As discussed above, this information may be retrieved from the calendar application 904, provided manually by a user, or obtained from another location. Once this information has been received, the routine 1000 continues to operation 1004.

At operation 1004, the device reader application 903 operates in conjunction with the reader device 902 in the manner described above to detect all of the proximately located authorization devices 102. Once the authorization devices 102 have been detected, the routine 1000 continues to operation 1006, where the device reader application 903 determines whether the number of expected participants at the meeting is equal to the number of detected authorization devices 102. If the number of expected participants is not equal to the number of detected authorization devices 102, the routine 1000 branches from operation 1008 to operation 1010.

At operation 1010, the device reader application 903 provides an indication to a user indicating that there are more or less than the number of expected meeting participants present. The identities of the actual participants, as based on the user data 406 stored in the detected authorization devices 102, may also be displayed. In this manner, a meeting administrator or organizer can ensure that only the proper individuals are present at a meeting. Once the notification has been provided, the routine 1000 continues from operation 1010 to operation 1012.

At operation 1012, the device reader application 903 determines whether all of the actual meeting participants, as based on the user data 406 stored in the detected authorization devices 102, are authorized to receive the information that is the subject of the meeting. This is accomplished by comparing the authorization data 410 retrieved from the detected authorization devices 102 to an identifier for the information to be discussed at a meeting, such as the number corresponding to a confidentiality agreement covering the subject matter of the meeting. If some of the actual participants are not authorized to receive the information, the routine 1000 branches from operation 1012 to operation 1014, where the device reader application 903 provides an indication that all of the present attendees are not authorized to receive the information that is the subject of the meeting. The device reader application 903 may specifically provide a display identifying the non-authorized but present participants. If all of the actual participants are authorized, the routine 1000 continues from operation 1012 to operation 1016, where it ends.

Figure 11:
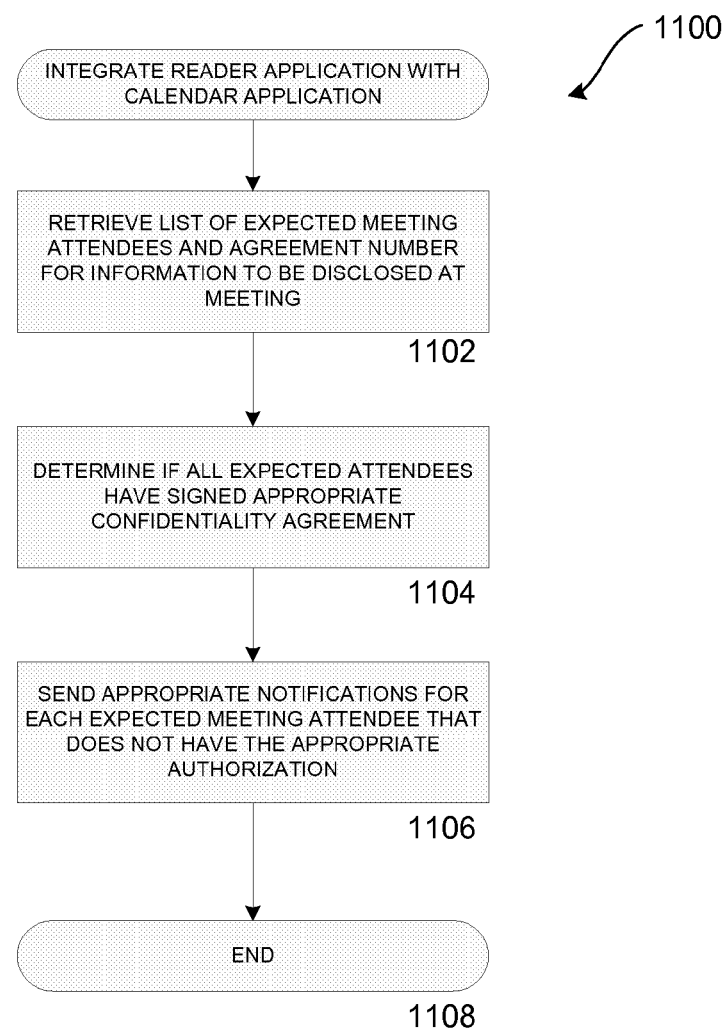
FIG. 11 is a flow diagram illustrating the operation of the reader device for providing notification to one or more expected meeting participants that are not authorized to receive information according to one embodiment described herein.

Turning now to FIG. 11, a routine 1100 illustrating the operation of the device reader application 902 in one embodiment for providing notification that one or more expected meeting participants are not authorized to receive information that is the subject of a meeting will be described. It should be appreciated that in one implementation the routine 1100 is performed by the device reader application 903 prior to a meeting in order to identify expected participants that do not have the required authorization and to provide a notification to such participants with sufficient notice to allow them to obtain the proper authorization prior to the scheduled meeting start time. For instance, the routine 1100 shown in FIG. 11 may be performed two hours prior to the start of a meeting.

The routine 1100 begins at operation 1102, where the device reader application 903 receives data identifying the number and identities of the expected participants at a meeting. The device reader application 903 also receives an identifier for the information to be disclosed at the meeting, such as the number corresponding to a confidentiality agreement covering the subject matter of the meeting. As discussed above, this information may be retrieved from the calendar application 904, provided manually by a user, or obtained from another location. Once this information has been received, the routine 1100 continues to operation 1104.

At operation 1104, the device reader application 903 retrieves the authorization data 410 for each of the expected meeting participants from the authorization data database 908. The device reader application 903 utilizes this information to determine whether each of the expected meeting participants has the appropriate authorization to receive the information that is the subject of the scheduled meeting. Once this determination has been made, the routine 1100 continues to operation 1106, where the device reader application 903 causes a notification to be transmitted to each expected meeting participant that does not have the appropriate authorization for the meeting. Notifications may also be transmitted to other responsible individuals, such as supervisory employees, administrators, and the like. The notification may take the form of an e-mail message, short messaging system ("SMS") message, voice mail, or other type of notification. Once the notification has been transmitted, the routine 1100 proceeds from operation 1106 to operation 1108, where it ends.

Figure 12:
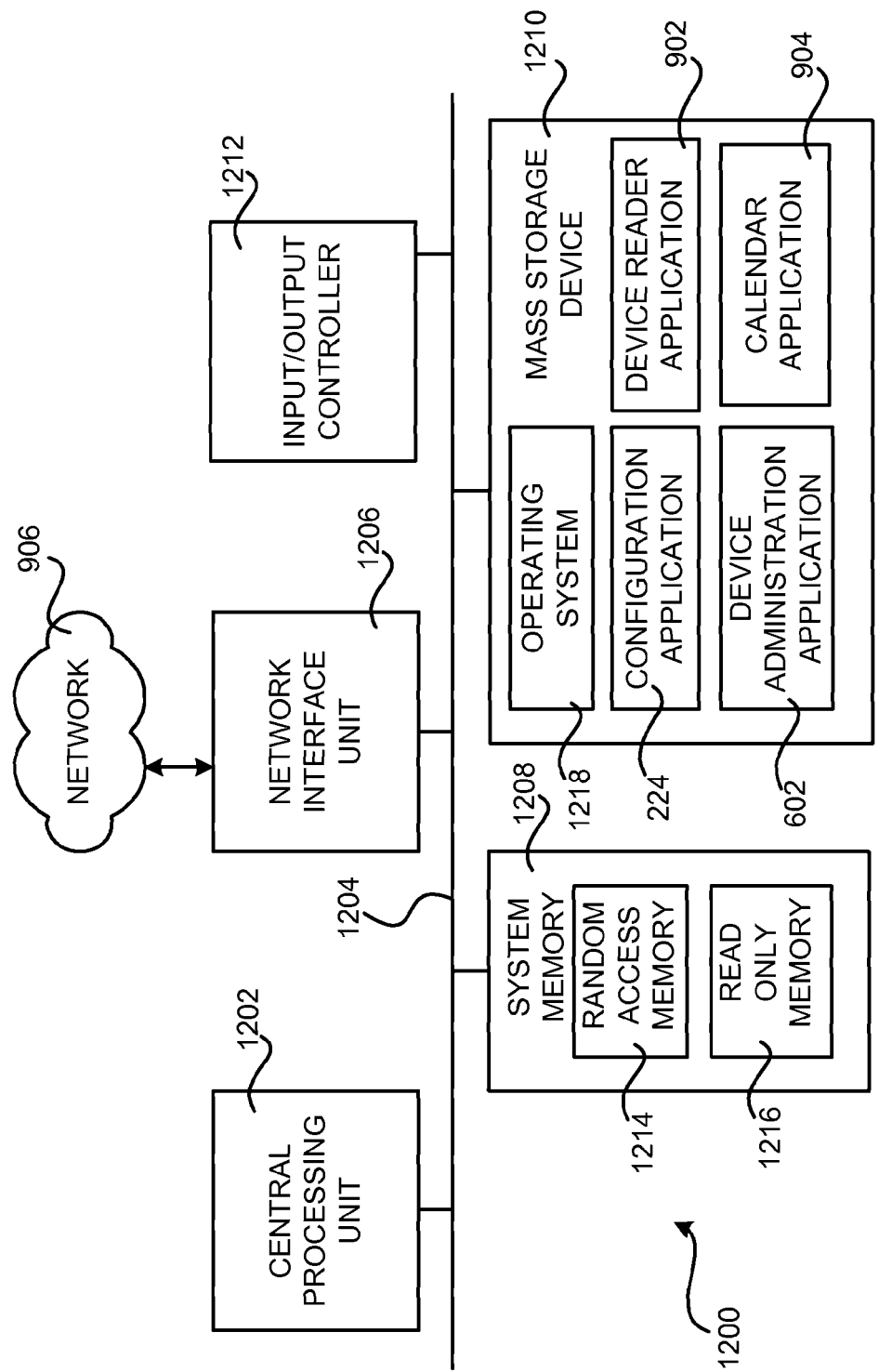
FIG. 12 is a computer architecture diagram showing a computer architecture suitable for implementing the various computer systems described herein.

Referring now to FIG. 12, an illustrative computer architecture for a computer 1200 utilized in the various embodiments presented herein will be discussed. The computer architecture shown in FIG. 12 illustrates a conventional desktop, laptop computer, or server computer, and may be utilized to embody the computer 222 or any of the other computer systems described herein. The computer architecture shown in FIG. 12 includes a CPU 1202, a system memory 1208, including a random access memory 1214 ("RAM") and a read-only memory ("ROM") 1216, and a system bus 1204 that couples the memory to the CPU 1202. A basic input/output system ("BIOS") containing the basic routines that help to transfer information between elements within the computer 1200, such as during startup, is stored in the ROM 1216. The computer 1200 further includes a mass storage device 1210 for storing an operating system 1218, application programs, and other program modules, which will be described in greater detail below.

The mass storage device 1210 is connected to the CPU 1202 through a mass storage controller (not shown) connected to the bus 1204. The mass storage device 1210 and its associated computer-readable media provide non-volatile storage for the computer 1200. Although the description of computer-readable media contained herein refers to a mass storage device, such as a hard disk or CD-ROM drive, it should be appreciated by those skilled in the art that computer-readable media can be any available media that can be accessed by the computer 1200.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 1200.

According to various embodiments, the computer 1200 may operate in a networked environment using logical connections to remote computers through the network 906. The network 906 may include a wireless network such as, but not limited to, a wireless local network ("WLAN") such as a WI-FI network, a wireless wide area network ("WWAN"), a wireless personal area network ("WPAN") such as BLUETOOTH, a wireless metropolitan area network ("WMAN") such a WiMAX network, a cellular network, or a satellite network. Alternatively, the network 906 may be a wired network such as, but not limited to, a wired WAN, a wired LAN such as the Ethernet, a wired PAN, or a wired MAN.

The computer 1200 may connect to the network 906 through a network interface unit 1206 connected to the bus 1204. It should be appreciated that the network interface unit 1206 may also be utilized to connect to other types of networks and remote computer systems. The computer 1200 may also include an input/output controller 1212 for receiving and processing input from a number of other devices, including a keyboard, mouse, or electronic stylus (not shown in FIG. 12). Similarly, an input/output controller may provide output to a display screen, a printer, or other type of output device (also not shown in FIG. 12).

As mentioned briefly above, a number of program modules and data files may be stored in the mass storage device 1210 and RAM 1214 of the computer 1200, including the operating system 1218 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that the implementations presented herein may be embodied using a desktop or laptop computer or any other computing devices or systems or combinations thereof.

The mass storage device 1210 and RAM 1214 may also store one or more program modules. In particular, the mass storage device 1210 and the RAM 1214 may store the configuration application 224, the device administration application 602, the device reader application 903, and the calendar application 904. Each of these program modules has been described above. Other program modules may also be stored within the mass storage device 1210 and the RAM 1214.

Based on the foregoing, it should be appreciated that apparatus, systems, methods, and computer-readable media for restricting access to information are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for determining whether a proximately located person is authorized to receive information, the method comprising:
   detecting, at a first authorization device, a second authorization device, wherein the first authorization device is operative to maintain first authorization data and wherein the second authorization device is associated with the proximately located person and is operative to maintain second authorization data indicating whether the proximately located person is authorized to receive the information;
   receiving, at the first authorization device, the second authorization data from the second authorization device, wherein the second authorization data indicates first topics of data the proximately located person is authorized to receive, wherein the first topics comprise a list of confidentiality agreements signed by the proximately located person indicating the data the proximately located person is authorized to receive;
   comparing, at the first authorization device, the first authorization data to the second authorization data to determine any matches between the first authorization data and second authorization data;
   in response to determining a match between the first authorization data and the second authorization data, displaying at the first authorization device, a first indication for each of the first topics of the second authorization data that matches the first authorization data, wherein the first indication displayed at the first authorization device identifies each of the first topics of the second authorization data that matches the first authorization data; and
   in response to determining no matches between the first authorization data and the second authorization data, displaying, at the first authorization data, a second indication that none of the second authorization data matches the first authorization data.

2. The method of claim 1, wherein the first authorization data comprises a second topic associated with the information, the method of claim 1 further comprising determining to provide the information to the proximately located person in response to one of the first topics of the second authorization data matching the second topic of the first authorization data associated with the information.

3. The method of claim 1, wherein the second authorization device is located in an area proximate to the first authorization device.

4. The method of claim 3, wherein detecting the second authorization device comprises:
   transmitting, from the first authorization device, a wireless signal within the area;
   receiving a response to the wireless signal from the second authorization device; and
   detecting a presence of the second authorization device based on the response to the wireless signal.

5. The method of claim 1, wherein detecting the second authorization device is performed periodically by the first authorization device.

6. The method of claim 1, wherein detecting the second authorization device is performed in response to a user request received at the first authorization device.

7. A first authorization device for determining whether a proximately located person is authorized to receive information, the first authorization device comprising:
   memory for storing a program containing code for determining whether the proximately located person is authorized to receive the information; and
   a processor functionally coupled to the memory, the processor being responsive to computer executable instruction contained in the program enabling the processor to perform a method comprising:
   detecting a second authorization device, wherein the first authorization device is operative to maintain first authorization data and wherein the second authorization device is associated with the proximately located person and is operative to maintain second authorization data indicating whether the proximately located person is authorized to receive the information,
   receiving the second authorization data from the second authorization device, wherein the second authorization data indicate first topics of data the proximately located person is authorized to receive, wherein the first topics comprise a list of confidentiality agreement signed by the proximately located person indicating the data the proximately located person is authorized to receive;
   comparing the first authorization data to the second authorization data to determine any matches between the first authorization data and second authorization data,
   in response to determining a match between the first authorization data and the second authorization data, displaying a first indication for each of the first topics of the second authorization data that matches the first authorization data, wherein the first indication displayed at the first authorization device identifies each of the first topics of the second authorization data that matches the first authorization data, and
   in response to determining no matches between the first authorization data and the second authorization data, displaying, at the first authorization device, a second indication that none of the second authorization data matches the first authorization data.

8. The first authorization device of claim 7, wherein the first authorization data comprises a second topic associated with the information and wherein the processor is enabled to perform a method further comprising determining to provide the information to the proximately located person in response to one of the first topics of the second authorization data matching the second topic of the first authorization data associated with the information.

9. The first authorization device of claim 7, wherein the processor is enabled to perform a method further comprising periodically detecting any proximately located authorization devices.

10. The first authorization device of claim 7, wherein the processor is enabled to perform a method further comprising detecting any proximately located authorization devices in response to a user request.

11. A non-transitory computer-readable medium having computer-executable instructions stored thereon which, when executed by a computer, cause the computer to perform a method comprising:

detecting a plurality of participants of a meeting by detecting an authorization device associated with each of the plurality of participants of the meeting, the authorization device operative to maintain authorization data indicating first topics of information each of the plurality of participants of the meeting is authorized to receive data;

determining whether each of the plurality of participants of the meeting is authorized to receive a second topic of information that is a subject of the meeting; and in response to determining that a participant of the plurality of participants is not authorized to receive the second topic of information that is the subject of the meeting, displaying an indication that all of the plurality of participants are not authorized to receive the second topic of information, wherein the indication identifies the participant of the plurality of participants that is not authorized to receive the second topic of information.

12. The non-transitory computer-readable medium of claim 11, having further computer-executable instructions stored thereon which, when executed by the computer, cause the computer to perform a method comprising:

receiving the authorization data from the authorization device; and comparing the second topic of information that is the subject of the meeting to the first topics of information of the authorization data to determine whether each of the plurality of participants of the meeting is authorized to receive the second topic of information that is the subject of the meeting.

13. The non-transitory computer-readable medium of claim 11, wherein the authorization data comprises a list of confidentiality agreements signed by each of the participants of the meeting indicating the first topics of information the each of the participants of the meeting is authorized to receive the data.

14. The non-transitory computer-readable medium of claim 11, wherein the authorization device is located in an area proximate to the meeting.

15. The non-transitory computer-readable medium of claim 14, wherein detecting the authorization device comprises:

transmitting a wireless signal within the area;
receiving a response to the wireless signal; and
detecting a presence of the authorization device based on the response to the wireless signal.

16. The non-transitory computer-readable medium of claim 11, wherein detecting the authorization device is performed in response to a user request.

* * * * *